United States Patent
Mihm et al.

(10) Patent No.: US 11,433,792 B2
(45) Date of Patent: Sep. 6, 2022

(54) SYSTEM AND METHOD OF ACTIVATING A SEAT HEAD RESTRAINT IN A VEHICLE

(71) Applicant: GM Global Technology Operations LLC, Detroit, MI (US)

(72) Inventors: Russell J. Mihm, Beverly Hills, MI (US); Venkata Narasimha R. Cherukuvada, Troy, MI (US); Niki K. Meyers, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 441 days.

(21) Appl. No.: 16/582,332

(22) Filed: Sep. 25, 2019

(65) Prior Publication Data
US 2021/0086674 A1 Mar. 25, 2021

(51) Int. Cl.
*B60N 2/829* (2018.01)
*B60N 2/00* (2006.01)
*B60R 22/48* (2006.01)

(52) U.S. Cl.
CPC ............ *B60N 2/829* (2018.02); *B60N 2/002* (2013.01); *B60R 22/48* (2013.01); *B60R 2022/4816* (2013.01); *B60R 2022/4858* (2013.01)

(58) Field of Classification Search
CPC ........ B60N 2/829; B60N 2/002; B60N 2/832; B60N 2/856; B60R 22/48; B60R 2022/4816; B60R 2022/4858
USPC .......................................................... 701/49
See application file for complete search history.

(56) References Cited

U.S. PATENT DOCUMENTS

| | | | | |
|---|---|---|---|---|
| 6,055,473 A | * | 4/2000 | Zwolinski | G01G 19/4142 701/45 |
| 2010/0295349 A1 | * | 11/2010 | Schaal | B60N 2/0244 297/216.12 |
| 2012/0235459 A1 | * | 9/2012 | Yetukuri | B60N 2/002 297/391 |
| 2020/0017068 A1 | * | 1/2020 | Moffa | B60N 2/002 |

\* cited by examiner

*Primary Examiner* — Tyler J Lee
*Assistant Examiner* — Sean Patrick Reidy
(74) *Attorney, Agent, or Firm* — Vivacqua Crane PLLC

(57) ABSTRACT

A method of activating a head restraint system in a vehicle for an occupant is provided. The method comprises providing a vehicle seat having a seat belt and a head restraint in the vehicle and detecting the occupant in the vehicle. The method further comprises actuating the seat head restraint of the vehicle seat to an in-use position if the seat belt is buckled. The method further includes providing an actuation signal to an electronic control module of the vehicle if the seat head restraint is actuated.

19 Claims, 3 Drawing Sheets

SYSTEM AND METHOD OF ACTIVATING A SEAT HEAD RESTRAINT IN A VEHICLE

INTRODUCTION

The present disclosure relates to vehicular head restraints and, more particularly, systems and methods of activating seat head restraints in a vehicle.

Head restraints are included in most current vehicles. Such head restraints are mostly stationary while some are manually adjustable. In many situations, adjustable head restraints are difficult to manually adjust. At times, vehicle occupants may not be aware that such restraints are manually adjustable.

SUMMARY

Thus, while current vehicle head restraints achieve their intended purpose, there is a need for a new and improved system and method for activating a seat head restraint in a vehicle.

According to several aspects, a method of activating a head restraint system in a vehicle for an occupant is provided. In one aspect of the present disclosure, the method comprises providing a vehicle seat having a seat belt and a head restraint in the vehicle. The method further comprises detecting the occupant having biometric parameters in the vehicle and actuating the seat head restraint of the vehicle seat to an in-use position based on the biometric parameters if the seat belt is buckled. The method further comprises providing an actuation signal to an electronic control module of the vehicle if the seat head restraint is actuated.

In one embodiment, the step of detecting the occupant in the vehicle comprises sensing pressure to the vehicle seat.

In another embodiment, the step of detecting the occupant in the vehicle comprises providing a door of the vehicle and then sensing the door opened and closed. The step of detecting further comprises activating a distance sensor relative to the vehicle seat. The step of detecting further comprises determining an occupant height category of the occupant with the distance sensor. In another example, the step of activating the distance sensor comprises sensing the occupant on the vehicle seat with the distance sensor.

In another example of this aspect of the present disclosure, the step of actuating the seat head restraint comprises moving the seat head restraint to the in-use position based on the occupant height category of the occupant.

In another embodiment, the method further comprises providing a first reminder signal to the occupant to buckle the seat belt if the seat belt is not buckled. In another example of the present disclosure, the method further comprises confirming the seat head restraint is in the in-use position after the step of actuating the seat head restraint. In this example, the method further comprises providing a second reminder signal to the occupant to manually deploy the seat head restraint if the seat head restraint is not in the in-use position. In yet another example, the method further comprises determining whether the seat belt is buckled if the occupant is detected.

In another aspect of the present disclosure, a method of activating a head restraint system in a vehicle for an occupant is provided. The method comprises providing a vehicle seat having a seat belt and a head restraint in the vehicle. The method further comprises sensing pressure on the vehicle seat to detect the occupant in the vehicle. The method further includes actuating the seat head restraint of the vehicle seat to an in-use position if the seat belt is buckled. The method further comprises providing an actuation signal to an electronic control module of the vehicle if the seat head restraint is actuated.

In one embodiment, the step of detecting the occupant in the vehicle comprises determining an occupant height category of the occupant with the pressure sensor. In one example, the step of actuating the seat head restraint comprises moving the seat head restraint to the in-use position based on the occupant height category of the occupant.

In another embodiment, the method further comprises providing a first reminder signal to the occupant to buckle the seat belt if the seat belt is not buckled.

In one example, the method further comprises confirming the seat head restraint is in the in-use position after the step of actuating the seat head restraint. In this example, the method further comprises providing a second reminder signal to the occupant to manually deploy the seat head restraint if the seat head restraint is not in the in-use position. In yet another example, the method further comprises determining whether the seat belt is buckled if the occupant is detected.

In another aspect of the present disclosure, a method of activating a head restraint system in a vehicle for an occupant is provided. In one embodiment, the method comprises providing a vehicle door and a vehicle seat having a seat belt and a head restraint and sensing the door opened and closed. In this aspect, the method further comprises activating a distance sensor relative to the vehicle seat to detect an occupant in the vehicle if the door is opened and closed. The method further comprises determining an occupant height category of the occupant with the distance sensor if an occupant is detected in the vehicle and then determining whether the seat belt is buckled if the occupant is detected. The method further includes actuating the seat head restraint of the vehicle seat to an in-use position if the seat belt is buckled. Furthermore, the method comprises providing an actuation signal to an electronic control module of the vehicle if the seat head restraint is actuated.

In one embodiment, the step of actuating the seat head restraint comprises moving the seat head restraint based on the occupant height category of the occupant. In another embodiment, the method further comprises providing a first reminder signal to the occupant to buckle the seat belt if the seat belt is not buckled.

In another embodiment, the method further comprises confirming the seat head restraint is in the in-use position after the step of actuating the seat head restraint. In this embodiment, the method further comprises providing a second reminder signal to the occupant to manually deploy the seat head restraint if the seat head restraint is not in the in-use position.

In another example of this aspect of the present disclosure, the method further comprises sensing pressure to the vehicle seat to detect an occupant in the vehicle.

In yet another embodiment, the step of activating the distance sensor comprises sensing the occupant on the vehicle seat with the distance sensor.

In another aspect of the present disclosure, a system for activating a head restraint system in a vehicle for an occupant is provided. In this embodiment, the system comprises a vehicle seat having a seat belt and a head restraint in the vehicle. The system further includes an electronic control module, a pressure sensor, and an actuation sensor.

In this example, the control module is disposed in the vehicle and has a processor for executing control logic or control logic commands. The control logic includes a first control logic or a first control logic set for actuating the seat head restraint of the vehicle seat to an in-use position. The pressure sensor is disposed in the vehicle seat to detect the occupant in the vehicle. In this embodiment, the pressure sensor is in communication with the electronic control module to send biometric data of the occupant to the electronic control module. Moreover, the actuation sensor is disposed adjacent the head restraint. The actuation sensor is in communication with the electronic control module for sending an actuation signal to the electronic control module when the seat head restraint is actuated.

In one example, the electronic control module includes a second control logic or second control logic set for determining an occupant height category of the occupant based on the biometric data of the occupant from the pressure sensor. Moreover, the first control logic for actuating the seat head restraint moves the seat head restraint to the in-use position based on the occupant height category of the occupant.

In another embodiment, the actuation sensor is disposed adjacent the head restraint to confirm the seat head restraint is in the in-use position. The electronic control module includes a second control logic for providing a second reminder signal to the occupant to manually deploy the seat head restraint when the seat head restraint is not in the in-use position.

In yet another embodiment, the system further comprises a seat belt sensor being in communication with the electronic control module to sense whether the seat belt is buckled and send a seat belt signal to the electronic control module. The electronic control module includes a third control logic or third control logic set for receiving the seat belt signal from the seat belt sensor and providing a first reminder signal to the occupant to buckle the seat belt when the seat belt is not buckled.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Each aspect of the present disclosure provides a method and system of activating a head restraint system for an occupant in a vehicle. When an occupant enters a vehicle and occupies a seat therein, each method provides an automated way of activating a head restraint of the seat. Such methods may be applied by way of sensors in communication with an electronic control module (ECM) of the vehicle. The sensors detect the occupant in the vehicle and communicate with the ECM, using algorithms, to automate the activation of the head restraints. When an occupant is detected, the head restraint is actuated to move the head restraint to an in-use position based on biometric data relative to the occupant, e.g. height.

Figure 1:
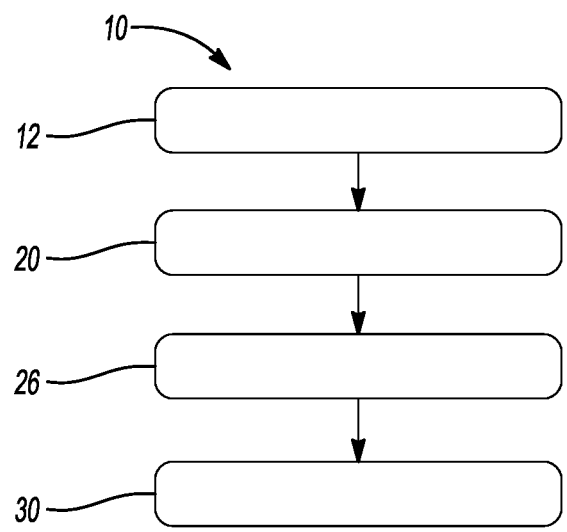
FIG. 1 is a flow chart of a method of activating a head restraint system in a vehicle for an occupant in accordance with one aspect of the present disclosure.
Figure 2:
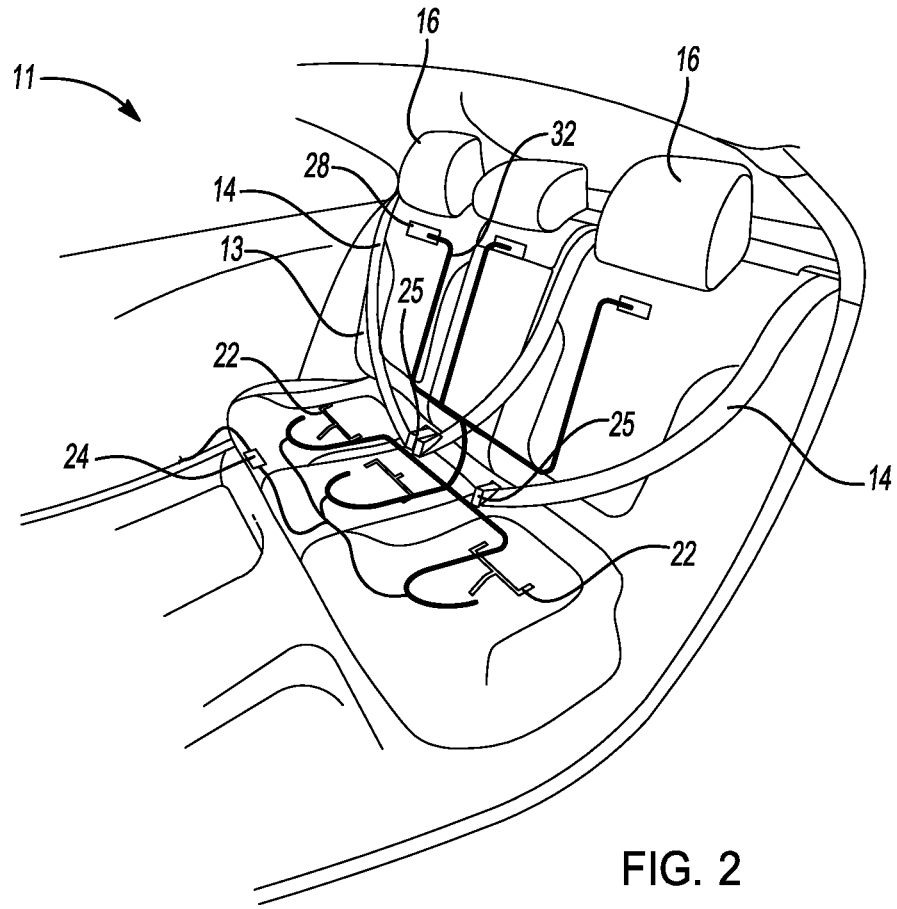
FIG. 2 is a perspective view of one example of the head restraint system of the method in FIG. 1.

According to FIG. 1, a method 10 of activating a head restraint 16 system in a vehicle for an occupant is disclosed. As shown in FIGS. 1 and 2, the method 10 comprises a step 12 of providing a vehicle seat 13 having a seat belt 14 and a head restraint 16 in the vehicle. The vehicle seat 13 may be any seat located within the vehicle such as the driver seat and any passenger seat in any row of the vehicle. Moreover, the seat 13 may be any suitable vehicle seat without departing from the spirit or scope of the present disclosure. For example, the seat 13 may be a bucket seat or a bench seat.

As depicted in FIG. 1, the method 10 further comprises a step 20 of detecting the occupant having biometric parameter in the vehicle. In this example, the step 20 of detecting the occupant may include sensing pressure on the vehicle seat 13 by way of a pressure sensor 22 or a mass sensor disposed within the vehicle seat 13. The pressure sensor 22 (or mass sensor) is preferably electronically connected and in communication with the ECM 24 comprising an algorithm associated with activating the vehicle seat head restraint 16. Preferably, as the occupant occupies the vehicle seat 13, the pressure sensor 22 receives pressure thereon by the occupant and transmits biometric data relative to the occupant to the ECM 24. It is to be understood that any suitable pressure sensor or mass sensor may be used without departing from the spirit or scope of the present disclosure.

In one example, the method 10 further comprises determining whether the seat belt 14 is buckled if the occupant is detected. Preferably, a seat belt sensor 25 may be disposed within the seat belt 14 and configured to sense or confirm that the seat belt 14 is buckled. It is understood that the seat belt sensor 25 may be any suitable sensor configured to sense that the seat belt 14 is buckled. In this embodiment, the seat belt sensor 25 then transmits data to the ECM 24 on whether the seat belt 14 is buckle.

If the seat belt 14 is not buckled, a first reminder signal, e.g. an audio chime, is provided to the occupant to buckle the seat belt 14. In one example, the ECM 24 is configured to activate an audio chime through vehicle speakers within the vehicle. In this example, the occupant then buckles the seat belt 14 in response to the first reminder signal, e.g. an audio chime. It is to be understood that the first reminder signal may be any other signal to the occupant that the seat belt 14 is to be buckled, such as a visual signal or a voice signal, without departing from the scope or spirit of the present disclosure.

As shown in FIG. 1, the method 10 further includes a step 26 of actuating the seat head restraint 16 of the vehicle seat 13 to an in-use position based on the biometric parameters if the seat belt 14 is buckled. In this example, the ECM 24 is configured to send an actuation signal to the seat head restraint 16 to actuate the seat head restraint 16 to the in-use position relative to the biometric data of the occupant. In one example, the seat head restraint 16 may comprise a receiver 28 configured to receive the actuation signal from the ECM 24, thereby actuating the seat head restraint 16 to the in-use position relative to the occupant.

In this example, the in-use position may take on various positions based on the biometric data of the occupant. For example, the occupant's pressure on the pressure sensor 22 may be used in the algorithm of the ECM 24 to determine a weight range of the occupant. The weight range may then be used to extrapolate a height of the occupant based on a presumed average weight-to-height range of an adult occupant. Other suitable ways of determining the in-use position may be used without departing from the spirit or scope of the present disclosure.

As shown, the method 10 further comprises a step 30 of providing an actuation signal to the ECM 24 if the seat head restraint 16 is actuated. In this example, the seat head restraint 16 may include an actuation sensor 32 configured to confirm that the seat head restraint 16 is in the in-use position. Preferably, the actuation sensor 32 then provides or transmits a confirmation signal to the ECM 24 that the seat head restraint 16 has been moved to the in-use position. It is understood that any suitable sensor may be used to confirm and provide a confirmation signal to the ECM 24 without departing from the spirit or scoped of the present disclosure.

In one example, the step 30 of providing the actuation signal further includes providing a second reminder signal to the occupant to manually deploy the seat head restraint 16 if the seat head restraint 16 is not in the in-use position. In this example, the ECM 24 is configured to activate an audio chime or voice signal to the occupant through vehicle speakers within the vehicle. In this example, the occupant then manually deploys or adjusts the head restraint 16 in response to the second signal, e.g. a voice signal. It is to be understood that the second reminder signal may be any other signal to the occupant that the seat head restraint 16 is to be manually deployed, such as a visual signal or a voice signal, without departing from the scope or spirit of the present disclosure.

Figure 3:
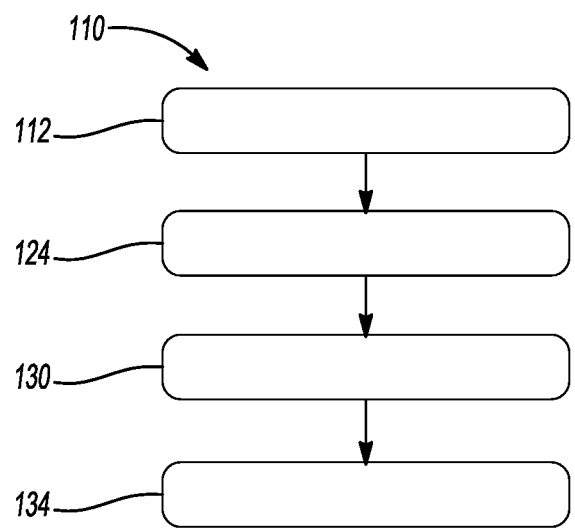
FIG. 3 is a flow chart of a method of activating a head restraint system in a vehicle for an occupant in accordance with another aspect of the present disclosure.
Figure 4:
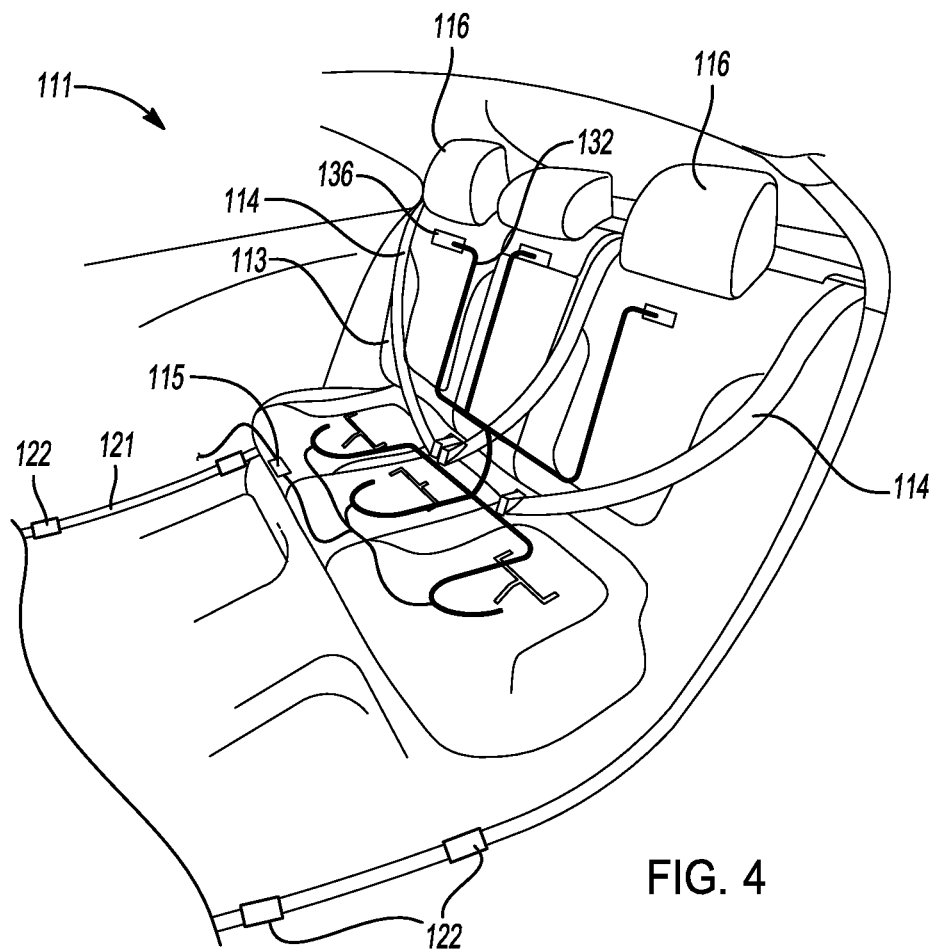
FIG. 4 is a perspective view of another example of the head restraint of the method in FIG. 3.

In accordance with another aspect and referring to FIGS. 3 and 4, a method 110 of activating a head restraint 116 in a vehicle for an occupant is provided. As shown in FIG. 3 and similar to the method depicted in FIG. 1, the method 110 comprises a step 112 of providing a vehicle seat having a seat belt 114 and a head restraint 116 in the vehicle. As in the previous example, the vehicle seat may be any seat located within the vehicle such as the driver seat and any passenger seat in any row of the vehicle. Moreover, the seat may be any suitable vehicle seat without departing from the spirit or scope of the present disclosure. For example, the seat may be a bucket seat or a bench seat.

Preferably, the method 110 further comprises a step 120 of detecting the occupant in the vehicle. In this example, the step 120 of detecting the occupant may include detecting a vehicle door 121 in an opened position by way of a door sensor 122. Moreover, the door sensor 122 is configured to sense or detect that the door 121 is opened. In this example, when the door 121 is detected to be in an open position, the door sensor 122 is configured to send a door open signal to the ECM 115. It is understood that any suitable door sensor 122 may be used to sense a vehicle door 121 in the opened position and communicate to the ECM 115, using algorithms, to automate the activation of the head restraint 116.

In a further example, the door sensor 122 is configured to sense or detect that the door 121 is subsequently closed. In this example, when the door is detected to be in a closed position subsequent to the opened position, the sensor is configured to send a door opened-closed signal to the ECM 115. It is understood that any suitable door sensor may be used to sense a vehicle has been opened and closed and communicate to the ECM 115, comprising algorithms, to automate the activation of the head restraint 116.

As shown in FIGS. 3 and 4, the method 110 further comprises a step 124 of sensing pressure on the vehicle seat. As in the previous example, the step 124 of sensing pressure on the vehicle seat may be by way of a pressure sensor 126 or a mass sensor disposed within the vehicle seat. In this example, the pressure sensor 126 (or mass sensor) is preferably electronically connected and in communication with the ECM 115 comprising an algorithm associated with activating the vehicle seat head restraint 116. Preferably, as the occupant occupies the vehicle seat, the pressure sensor 126 receives pressure thereon by the occupant and transmits biometric data relative to the occupant to the ECM 115. It is to be understood that any suitable pressure sensor or mass sensor may be used without departing from the spirit or scope of the present disclosure.

In this example as well, the method 110 further comprises determining whether the seat belt 114 is buckled if there is pressure on the vehicle seat. Preferably, a seat belt sensor (discussed above) may be disposed within the seat belt 114 and configured to sense or confirm that the seat belt 114 is buckled. If the seat belt 114 is not buckled, a first reminder signal (discussed above), e.g. an audio chime, is provided to the occupant to buckle the seat belt 114. In one example, the ECM 115 is configured to activate an audio chime through vehicle speakers within the vehicle. In this example, the occupant buckles the seat belt 114 in response to the first reminder signal.

As shown in FIGS. 3 and 4, the method 110 further includes a step 130 of actuating the seat head restraint 116 of the vehicle seat to an in-use position if the seat belt 114 is buckled. In this example and similar to the example in FIG. 1, the ECM 115 is configured to send an actuation signal to the seat head restraint 116 to actuate the seat head restraint 116 to an in-use position relative to the biometric data of the occupant. In this example, the seat head restraint 116 may comprise a receiver 132 configured to receive the actuation signal from the ECM 115, thereby actuating the seat head restraint 116 to the in-use position relative to the occupant.

As in the previous example above, the in-use position may take on various positions based on the biometric data of the occupant. For example, the occupant's pressure on the pressure sensor 126 may be used in the algorithm of the ECM 115 to determine a weight range of the occupant. The weight range may then be used to extrapolate a height of the occupant based on a presumed average weight-to-height range of an adult occupant. Other suitable ways of determining the in-use position may be used without departing from the spirit or scope of the present disclosure.

As shown in FIGS. 3 and 4, the method 110 further comprises a step 134 of providing an actuation signal to the ECM 115 if the seat head restraint 116 is actuated. In this example, the restraint 116 may include an actuation sensor 136 (discussed above) configured to confirm that the seat head restraint 116 is in the in-use position. Preferably, the actuation sensor 136 then provides or transmits a confirmation signal to the ECM 115 that the seat head restraint 116 has been moved to the in-use position. In one example, the step 134 of providing the actuation signal further includes providing a second reminder signal (discussed above) to the occupant to manually deploy the seat head restraint 116 if the seat head restraint 116 is not in the in-use position. In this example, the ECM 115 is configured to activate an audio chime or voice signal to the occupant through vehicle speakers within the vehicle. In one example, the occupant then manually deploys or adjusts the head restraint 116 in response to the second reminder signal, e.g., a voice signal.

Figure 5:
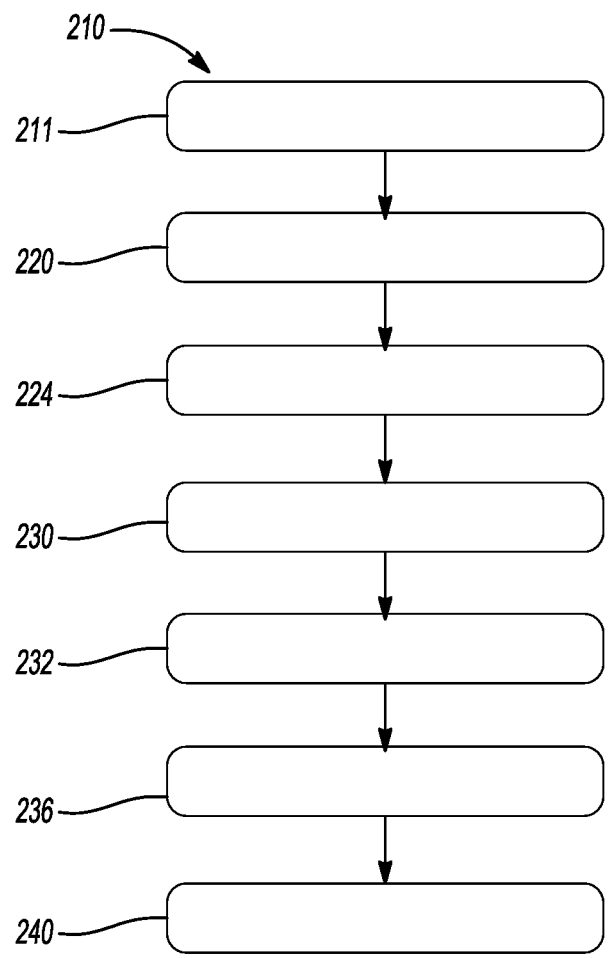
FIG. 5 is another flow chart of a method of activating a head restraint system in a vehicle for an occupant in accordance with another aspect of the present disclosure.
Figure 6:
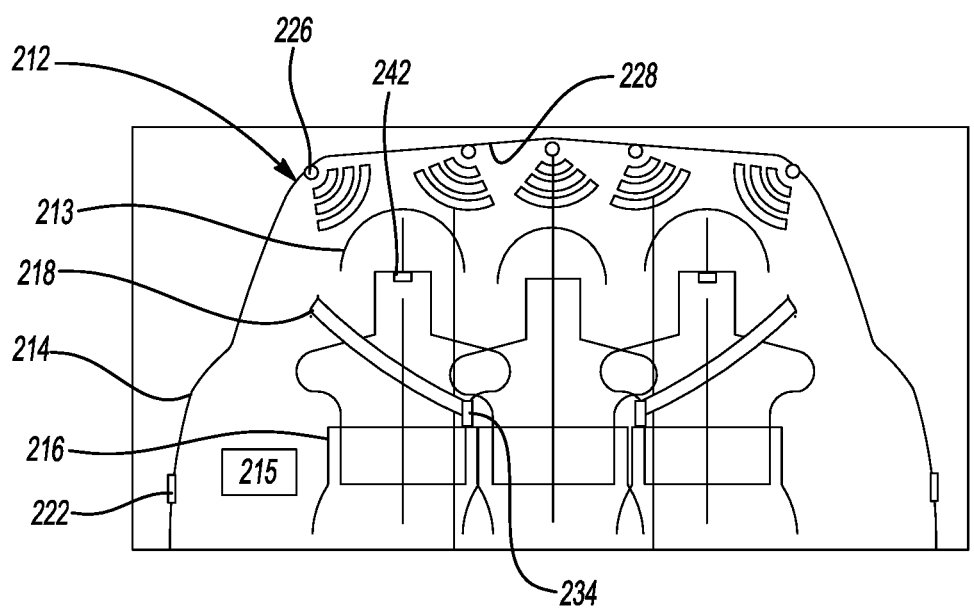
FIG. 6 is a schematic diagram of the head restraint of the method in FIG. 5.

Referring to FIGS. 5 and 6, a method 210 of activating a head restraint 213 in a vehicle 212 for an occupant is provided in accordance with another aspect of the present disclosure. In one example, the method 210 comprises providing a vehicle door 214 and a vehicle seat 216 having a seat belt 218 and a head restraint 213. As in the previous examples, the vehicle seat 216 may be any seat located within the vehicle such as the driver seat and any passenger seat in any row of the vehicle. Moreover, the seat 216 may be any suitable vehicle seat without departing from the spirit or scope of the present disclosure. For example, the seat may be a bucket seat or a bench seat.

Preferably, the method 210 further comprises a step 220 of sensing the door 214 opened and closed to detect whether an occupant in the vehicle 212. In this example, the step 220 of sensing the door 214 opened and closed may include detecting a vehicle door in an opened position by way of a door sensor 222 (previously discussed). Moreover, the door sensor 222 is configured to sense or detect that the door 214 is opened. In this example, when the door 214 is detected to be in an open position, the door sensor 222 is configured to send a door open signal to the ECM 215. Moreover in this example, the door sensor 222 is configured to sense or detect that the door 214 is subsequently closed. In this example, when the door 214 is detected to be in a closed position subsequent to the opened position, the door sensor 222 is configured to send a door opened-closed signal to the ECM 215 as previously discussed.

In this example, the method 210 further comprises a step of activating a distance sensor 226 relative to the vehicle seat 216 to detect an occupant in the vehicle 212 if the door 214 is opened and closed. Preferably, the distance sensor 226 is disposed on a vehicle headliner 228 aimed or positioned toward the occupant. However, the distance sensor 226 may be disposed in any other portion of the vehicle 212 without departing from the spirit or scope of the present disclosure. Furthermore, one or a plurality of distance sensors may be used without departing from the spirit or scope of the present disclosure.

The distance sensor 226 is configured to estimate the height of the occupant such that the seat head restraint 213 may be positioned adjacent to the occupant's head. The distance sensor 226 is preferably electronically connected and in communication with the ECM 215 comprising an algorithm associated with activating the vehicle seat head restraint 213. Preferably, as the occupant occupies the vehicle seat 216, the distance sensor 226 senses the position of the occupant relative to the seat 216 or headliner 228 and transmits biometric data relative to the occupant to the ECM 215. It is to be understood that any suitable distance sensor may be used without departing from the spirit or scope of the present disclosure.

The method 210 further comprises a step 230 of determining an occupant height category or range of the occupant with the distance sensor 226. In one example, the ECM 215 associates the occupant in a designated height category based on the occupant's biometric data gathered and transmitted by the distance sensor 226. In this embodiment, there may be a plurality of height categories associated for a range of occupant heights. Preferably, the height category is directly related to the in-use position of the seat head restraint 213 when deployed as discussed below.

Moreover, the method 210 further comprises a step 232 of determining whether the seat belt 218 is buckled. Preferably, a seat belt sensor 234 (discussed above) may be disposed within the seat belt 218 and configured to sense or confirm that the seat belt 218 is buckled. If the seat belt 218 is not buckled, a first reminder signal, e.g. an audio chime, is provided to the occupant to buckle the seat belt 218. In one example, the ECM 215 is configured to activate an audio chime through vehicle speakers within the vehicle 212. In this example, the occupant then manually buckles the seat belt 218 in response to the first reminder signal.

As shown in FIGS. 5 and 6, the method 210 further includes a step 236 of actuating the seat head restraint 213 of the vehicle seat 216 to an in-use position if the seat belt 218 is buckled. In this example and similar to the example in FIG. 1, the ECM 215 is configured to send an actuation signal to the seat head restraint 213 to actuate the seat head restraint 213 to an in-use position relative to the biometric data of the occupant. In this example, the seat head restraint 213 may comprise an actuation assembly including a receiver configured to receive the actuation signal from the ECM 215, thereby actuating the seat head restraint 213 to the in-use position relative to the occupant.

As in the previous example above, the in-use position may take on various positions based on the biometric data of the occupant. For example, the occupant's distance from the headliner 228 may be used in the algorithm of the ECM 215 to determine a height category with which the occupant is to be associated. The height category may be associated with a distance which the seat head restraint 213 is to be deployed or moved relative to the vehicle seat 216.

Other suitable ways of determining the in-use position may be used without departing from the spirit or scope of the present disclosure.

As shown in FIGS. 5 and 6, the method 210 further comprises a step 240 of providing an actuation signal to the ECM 215 if the seat head restraint 213 is actuated. In this example, the actuation assembly may include an actuation sensor 242 (discussed above) configured to confirm that the seat head restraint 213 is in the in-use position. Preferably, the actuation sensor 242 then provides or transmits a confirmation signal to the ECM 215 that the seat head restraint 213 has been moved to the in-use position. In one example, the step 240 of providing the actuation signal further includes providing a second reminder signal (discussed above) to the occupant to manually deploy the seat head restraint 213 the seat head restraint 213 is not in the in-use position. In this example, the ECM 215 is configured to activate an audio chime or voice signal to the occupant through vehicle speakers within the vehicle 212. In one example, the occupant then manually deploys or adjusts the head restraint 213 in response to the second reminder signal, e.g. a voice signal.

With any of the examples discussed above, each of the methods 10, 110, and 210 further comprises a step of allowing the occupant to further adjust the head restraint 213 and a step of manually adjusting the head restraint 213 to comfort or safely. In an event where the deployed head restraint 213 could be further adjusted relative to the occupant, the head restraint 213 is configured to be manually adjustable. The step of manually adjusting the head restraint 213 allows the occupant to further adjust the head restraint 213 after the step 236 of actuating the seat head restraint 213. Thus, the occupant is able to further manually adjust the head restraint 213 accordingly by any suitable manner without departing from the spirit or scope of the present disclosure.

Hence, after the steps of providing the actuation signal, the ECM 215 is configured to activate a third signal and indicated through vehicle speakers by way of, for example, an audio chime or voice signal, to the occupant through vehicle speakers within the vehicle 212. For example, a voice signal may indicate to the occupant that manual adjustment is available. In this example, the occupant then further manually adjusts the head restraint 213 in response to the third reminder signal. It is to be understood that the third reminder signal may be any other signal to the occupant that the seat head restraint 213 may be manually deployed, such as a visual signal or a voice signal, without departing from the scope or spirit of the present disclosure.

What is claimed is:

1. A method of activating a head restraint system in a vehicle for an occupant, the method comprising:
   providing a vehicle seat having a seat belt and a seat head restraint in the vehicle;
   detecting the occupant in the vehicle;
   receiving, by an electronic control module, biometric data from a pressure sensor disposed in the vehicle seat, wherein the biometric data includes a pressure exerted by the occupant on the pressure sensor;
   determining, by the electronic control module, a weight range of the occupant based on the pressure exerted by the occupant on the pressure sensor;
   determining, by the electronic control module, a height of the occupant based on the previously determined weight range of the occupant and a predetermined weight-to-height range of a hypothetical adult occupant;
   actuating the seat head restraint of the vehicle seat to an in-use position in response to detecting the occupant in the vehicle when the seat belt is buckled; and
   providing an actuation signal to an electronic control module of the vehicle in response to actuating the seat head restraint, wherein the actuation signal is indicative that the seat head restraint has been actuated.

2. The method of claim 1 wherein the step of detecting the occupant in the vehicle comprises sensing pressure to the vehicle seat.

3. The method of claim 1 wherein the step of detecting the occupant in the vehicle comprises:
   providing a door of the vehicle;
   sensing the door opened and closed;
   activating a distance sensor relative to the vehicle seat; and
   determining an occupant height category of the occupant with the distance sensor.

4. The method of claim 3 wherein the step of actuating the seat head restraint comprises moving the seat head restraint to the in-use position based on the occupant height category of the occupant.

5. The method of claim 3 wherein the step of activating the distance sensor comprises sensing the occupant on the vehicle seat with the distance sensor.

6. The method of claim 1 further comprising:
   providing a first reminder signal to the occupant to buckle the seat belt when the seat belt is not buckled.

7. The method of claim 1 wherein the step of providing the actuation signal comprises:
   confirming the seat head restraint is in the in-use position after the step of actuating the seat head restraint;
   providing a second reminder signal to the occupant to manually deploy the seat head restraint when the seat head restraint is not in the in-use position; and
   wherein the actuation signal is provided after the seat head restraint of the vehicle has been moved to the in-use position.

8. The method of claim 1 further comprising determining whether the seat belt is buckled when the occupant is detected.

9. A system for activating a head restraint system in a vehicle for an occupant, the method comprising:
   a vehicle seat having a seat belt and a seat head restraint in the vehicle;
   an electronic control module disposed in the vehicle, the electronic control module having a processor for executing control logic, the control logic including a first control logic for actuating the seat head restraint of the vehicle seat to an in-use position;
   a pressure sensor disposed in the vehicle seat to detect the occupant in the vehicle, the pressure sensor being in communication with the electronic control module to send biometric data of the occupant to the electronic control module;
   an actuation sensor disposed adjacent the seat head restraint, the actuation sensor being in communication with the electronic control module for sending an actuation signal to the electronic control module when the seat head restraint is actuated, wherein the actuation sensor is configured to detect an actuation of the seat head restraint, and the actuation sensor is configured to generate an actuation signal that is indicative of the actuation of the seat head restraint; and
   wherein the biometric data includes a pressure exerted by the occupant on the pressure sensor, the electronic control module is configured to determine a weight range of the occupant based on the pressure exerted by the occupant on the pressure sensor, and the electronic control module is configured to determine a height of the occupant based on the previously determined weight range of the occupant and a predetermined weight-to-height range of a hypothetical adult occupant.

10. The system of claim 9 wherein the electronic control module includes a second control logic for determining an occupant height category of the occupant based on the biometric data of the occupant from the pressure sensor, and the first control logic for actuating the seat head restraint moves the seat head restraint to the in-use position based on the occupant height category of the occupant.

11. The system of claim 9 wherein the actuation sensor is disposed adjacent the head restraint to confirm the seat head restraint is in the in-use position and wherein the electronic control module includes a second control logic for providing a second reminder signal to the occupant to manually deploy the seat head restraint when the seat head restraint is not in the in-use position.

12. The system of claim 9 further comprising a seat belt sensor being in communication with the electronic control module to sense whether the seat belt is buckled and send a seat belt signal to the electronic control module.

13. The system of claim 12 wherein the electronic control module includes a third control logic for receiving the seat belt signal from the seat belt sensor and providing a first reminder signal to the occupant to buckle the seat belt when the seat belt is not buckled, the actuation sensor is configured to send the actuation signal to the electronic control module after the seat head restraint has been actuated and after the seat head restraint has been moved to the in-use position.

14. A method of activating a head restraint system in a vehicle for an occupant, the method comprising:
   providing a vehicle door and a vehicle seat having a seat belt and a seat head restraint;

sensing the vehicle door opened and closed;
receiving, by an electronic control module, biometric data from a pressure sensor disposed in the vehicle seat, wherein the biometric data includes a pressure exerted by the occupant on the pressure sensor;
determining, by the electronic control module, a weight range of the occupant based on the pressure exerted by the occupant on the pressure sensor;
determining, by the electronic control module, a height of the occupant based on the previously determined weight range of the occupant and a predetermined weight-to-height range of a hypothetical adult occupant;
determining whether the seat belt is buckled when the occupant is detected;
actuating the seat head restraint of the vehicle seat to an in-use position when the seat belt is buckled; and
providing an actuation signal to an electronic control module of the vehicle in response to actuating the seat head restraint, wherein the actuation signal is indicative that the seat head restraint has been actuated.

15. The method of claim 14 wherein the step of actuating the seat head restraint comprises moving the seat head restraint based on the occupant height category of the occupant, and the actuation signal is provided to the electronic control module after the seat head restraint has been actuated and after the seat head restraint has been moved to the in-use position.

16. The method of claim 14 further comprising:
providing a first reminder signal to the occupant to buckle the seat belt when the seat belt is not buckled.

17. The method of claim 14 further comprising
confirming the seat head restraint is in the in-use position after the step of actuating the seat head restraint; and
providing a second reminder signal to the occupant to manually deploy the seat head restraint when the seat head restraint is not in the in-use position.

18. The method of claim 14 further comprising sensing pressure to the vehicle seat to detect the occupant in the vehicle.

19. The method of claim 14 wherein the step of activating the distance sensor comprises sensing the occupant on the vehicle seat with the distance sensor.

* * * * *